United States Patent
Feltman et al.

(10) Patent No.: US 12,398,700 B2
(45) Date of Patent: Aug. 26, 2025

(54) WIND TURBINE BEARING AND METHOD OF LUBRICATION

(71) Applicant: Renew Energy Maintenance, LLC, Sioux Falls, SD (US)

(72) Inventors: Michael Paul Feltman, Sioux Falls, SD (US); Gary David Cavigielli, Howard, SD (US); Herman Wipf, Brandon, SD (US); Paul Michael Terwee, Sioux Falls, SD (US)

(73) Assignee: Renew Energy Maintenance, LLC, Sioux Falls, SD (US)

( * ) Notice: Subject to any disclaimer, the term of this patent is extended or adjusted under 35 U.S.C. 154(b) by 145 days.

(21) Appl. No.: 18/352,821

(22) Filed: Jul. 14, 2023

(65) Prior Publication Data
US 2024/0018946 A1    Jan. 18, 2024

Related U.S. Application Data

(60) Provisional application No. 63/389,068, filed on Jul. 14, 2022.

(51) Int. Cl.
| | | |
|---|---|---|
| *F03D 80/70* | (2016.01) | |
| *F16C 19/28* | (2006.01) | |
| *F16C 33/48* | (2006.01) | |
| *F16C 33/66* | (2006.01) | |

(52) U.S. Cl.
CPC .......... *F03D 80/709* (2023.08); *F16C 19/28* (2013.01); *F16C 33/48* (2013.01); *F16C 33/6629* (2013.01); *F05B 2230/80* (2013.01); *F05B 2240/50* (2013.01); *F05B 2260/98* (2013.01); *F16C 2360/31* (2013.01)

(58) Field of Classification Search
CPC . F03D 80/709; F16C 33/6622; F05B 2260/98
See application file for complete search history.

(56) References Cited

U.S. PATENT DOCUMENTS

| | | | | |
|---|---|---|---|---|
| 5,897,100 A * | 4/1999 | Napier | .................. | B66C 23/485 |
| | | | | 254/133 R |
| 6,459,165 B1 * | 10/2002 | Schoo | ....................... | F16H 1/46 |
| | | | | 290/55 |
| 6,761,082 B2 * | 7/2004 | Hulshof | .................. | F03D 15/10 |
| | | | | 74/665 G |

(Continued)

*Primary Examiner* — Michael A Riegelman
(74) *Attorney, Agent, or Firm* — Fredrikson & Byron, P.A.

(57) ABSTRACT

A method of lubricating a main bearing of a wind turbine, the method comprising providing the main bearing. The main bearing comprises a main bearing housing having one or more pre-existing lubrication ports, an outer race, an inner race radially disposed inwardly from the outer race, and a first row of roller bearings and a second row of roller bearings. The first and second rows of roller bearings are radially disposed between the inner race and the outer race. The first row of roller bearings is axially disposed on the upwind side of the second row of roller bearings. The method includes forming one or more alternate lubrication ports in the main bearing housing. The alternate lubrication ports are configured to deliver a lubricant between the first row of roller bearings and the second row of roller bearings. The method includes supplying the lubricant to the alternate lubrication ports.

21 Claims, 11 Drawing Sheets

(56) References Cited

U.S. PATENT DOCUMENTS

| | | | | |
|---|---|---|---|---|
| 8,128,525 | B2* | 3/2012 | Dinter | F03D 15/10 |
| | | | | 475/159 |
| 8,341,840 | B2* | 1/2013 | Kawano | F16C 35/077 |
| | | | | 29/889.6 |
| 9,097,237 | B2* | 8/2015 | Eddy | F03D 15/00 |
| 9,784,246 | B2* | 10/2017 | Eddy | B66C 23/166 |
| 11,624,351 | B2* | 4/2023 | Eliason | F03D 15/00 |
| | | | | 29/888.021 |
| 11,754,055 | B2* | 9/2023 | Hansen | F16C 33/7889 |
| | | | | 416/1 |
| 11,994,113 | B2* | 5/2024 | Pedersen | F16N 29/02 |
| 2009/0324380 | A1* | 12/2009 | Pedersen | B66C 1/108 |
| | | | | 290/55 |
| 2010/0111665 | A1* | 5/2010 | Daniels | F03D 80/50 |
| | | | | 414/814 |
| 2011/0006543 | A1* | 1/2011 | Hu | F03D 3/02 |
| | | | | 290/55 |
| 2011/0089709 | A1* | 4/2011 | Neeper | B66C 1/44 |
| | | | | 294/119.1 |
| 2011/0143880 | A1* | 6/2011 | Minadeo | F03D 15/10 |
| | | | | 475/346 |
| 2012/0015776 | A1* | 1/2012 | Lemmers, Jr. | F01D 21/006 |
| | | | | 74/411.5 |
| 2012/0133147 | A1* | 5/2012 | Numajiri | F03D 80/50 |
| | | | | 290/55 |
| 2016/0025073 | A1* | 1/2016 | Fujiwara | F03D 80/70 |
| | | | | 416/169 R |
| 2017/0335891 | A1* | 11/2017 | Hikida | F16H 13/06 |
| 2021/0396217 | A1* | 12/2021 | Hansen | F16J 15/3212 |
| 2024/0018946 | A1* | 1/2024 | Feltman | F16C 33/48 |

\* cited by examiner

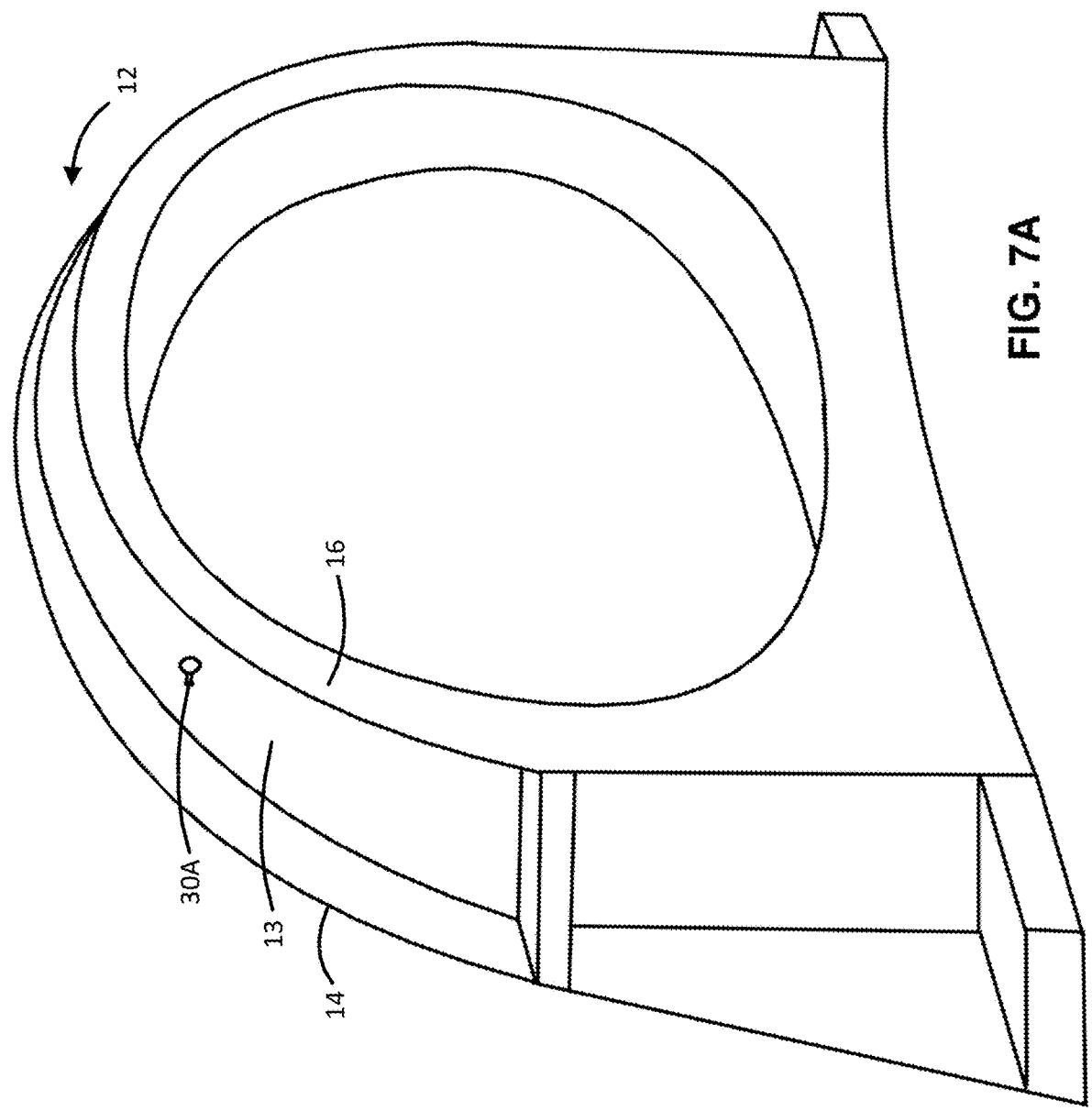

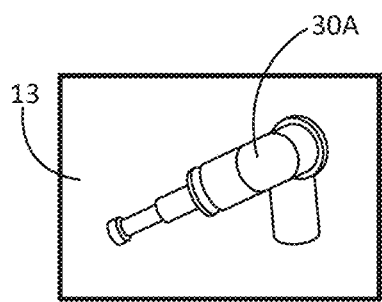 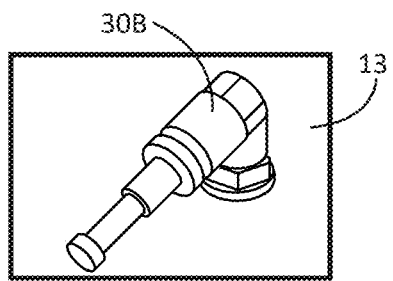
FIG. 9A  FIG. 9B
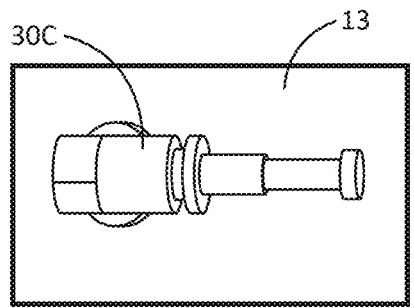
FIG. 9C

WIND TURBINE BEARING AND METHOD OF LUBRICATION

CROSS-REFERENCE TO RELATED APPLICATION(S)

This application claims the benefit under 35 U.S.C. § 119(e) to U.S. Provisional Application 63/389,068, filed Jul. 14, 2022 and entitled WIND TURBINE BEARING AND METHOD OF LUBRICATION, which is hereby incorporated herein by reference in its entirety.

FIELD

The various embodiments herein relate to methods of lubricating wind turbine bearings.

BACKGROUND

Wind turbines include a variety of equipment, including a main bearing housing. The main bearing housing can include lubrication ports and two rows of roller bearings. One row of roller bearings can be at an upwind location, and the other row of roller bearings can be at a downwind location on the turbine. The downwind row of roller bearings holds a heavier load than the upwind row of roller bearings, as the downwind row absorbs most of the thrust load applied by wind to the rotor blades of the turbine. The lubrication ports can be disposed on the bearing at an upwind location.

When a lubricant (typically grease) is applied to the lubrication port, the grease first travels through the upwind roller bearings and associated structures separating the two rows of roller bearings before travelling through the downwind roller bearings. By being first pushed through the upwind roller bearings, the grease is typically used to a degree once it reaches the downwind roller bearings, which degrades the grease. As a result, downwind equipment and infrastructure is most likely to fail first, which can increase the cost of repairs.

There is a need in the art for improved lubrication methods of wind bearings.

BRIEF SUMMARY

Discussed herein are various embodiments directed to methods of lubrication of a wind turbine main bearing.

One embodiment is of a method of lubricating a wind turbine main bearing of a wind turbine, the method comprising providing the wind turbine main bearing, the wind turbine main bearing comprising a main bearing housing having one or more pre-existing lubrication ports disposed on an upwind side of the main bearing housing, an outer race, an inner race radially disposed inwardly from the outer race, and a first row of roller bearings and a second row of roller bearings, the first and second rows of roller bearings being radially disposed between the inner race and the outer race, the first row of roller bearings being axially disposed on the upwind side of the second row of roller bearings; and supplying a lubricant between the first row of roller bearings and the second row of roller bearings via one or more alternate lubrication ports formed in the main bearing housing. In some embodiments, a method of lubricating a wind turbine main bearing of a wind turbine may further comprise forming the one or more alternate lubrication ports in the main bearing housing. In some further embodiments, forming the one or more alternate lubrication ports in the main bearing housing may further comprise drilling a hole through the main bearing housing. Additionally or optionally, the method may further comprise inserting a magnetic probe into the hole to remove debris from the hole (e.g., debris created by the drilling process). Additionally or optionally, the method may further comprise installing a grease fitting at an entrance to the hole.

In a further embodiment, the method further comprises removing one or more main bearing housing covers from the main bearing housing prior to forming the one or more alternate lubrication ports.

In a further embodiment, the method further comprises re-attaching the one or more main bearing housing covers to the main bearing housing after forming the one or more alternate lubrication ports.

In a further embodiment, the one or more alternate lubrication ports are configured to deliver the lubricant supplied thereto to a radial groove in the outer race, the radial groove being disposed axially between the first row of roller bearings and the second row of roller bearings.

In a further embodiment, the lubricant delivered to the radial groove travels through the first row of roller bearings toward the upwind side of the main bearing housing and travels through the second row of roller bearings toward a downwind side of the main bearing housing.

In a further embodiment, the first row of roller bearings and the second row of roller bearings are separated by a central rib formed on the inner race.

In a further embodiment, the method further comprises a split brass cage separating the first row of roller bearings from the second row of roller bearings.

In a further embodiment, the method further comprises disconnecting one or more lubrication lines from the one or more pre-existing lubrication ports, and reconnecting the one or more lubrication lines to the one or more alternate lubrication ports.

In a further embodiment, the one or more alternate lubrication ports comprises at least two alternate lubrication ports.

In a further embodiment, the at least two alternate lubrication ports comprises three alternate lubrication ports.

In a further embodiment, the three alternate lubrication ports are disposed circumferentially about a top half of the main bearing housing.

In a further embodiment, the three alternate lubrication ports are disposed circumferentially at a 9 o'clock position, an 11 o'clock position, and a 3 o'clock position about the top half of the main bearing housing.

In a further embodiment, forming at least one of the one or more alternate lubrication ports further comprises drilling a hole through the main bearing housing, inserting a magnetic probe into the hole to remove debris from the hole, and installing a grease fitting at an entrance to the hole.

In a further embodiment, the method is performed while the wind turbine main bearing remains installed at an on-site field location.

In a further embodiment, the method further comprises removing the wind turbine main bearing from the wind turbine prior to performing the method.

One embodiment of a method of modifying a wind turbine main bearing of a wind turbine comprises providing the wind turbine main bearing, the wind turbine main bearing comprising a main bearing housing having an upwind side and a downwind side, an outer race within the main bearing housing, an inner race within the main bearing housing, the inner race disposed radially inwardly from the outer race, and a first row of roller bearings and a second row of roller bearings, the first and second rows of roller bearings being radially disposed between the inner race and the outer race, the first row of roller bearings being axially disposed on the upwind side of the second row of roller bearings. The method includes forming one or more radially directed lubrication ports in the main bearing housing, the one or more radially directed lubrication ports configured to deliver a lubricant supplied thereto between the first row of roller bearings and the second row of roller bearings.

In a further embodiment, the one or more radially directed lubrication ports formed in the main bearing housing includes three lubrication ports disposed circumferentially about the top half of the main bearing housing.

In a further embodiment, the three lubrication ports are disposed at a 9 o'clock position, an 11 o'clock position, and a 3 o'clock position about the top half of the main bearing housing as viewed from the downwind side of the main bearing housing.

In a further embodiment, the one or more radially directed lubrication ports formed in the main bearing housing includes two lubrication ports disposed circumferentially about the top half of the main bearing housing.

In a further embodiment, the two lubrication ports are disposed at a 10 o'clock position and a 2 o'clock position about the top half of the main bearing housing as viewed from the downwind side of the main bearing housing.

While multiple embodiments are disclosed, still other embodiments will become apparent to those skilled in the art from the following detailed description, which shows and describes illustrative embodiments. As will be realized, the various implementations are capable of modifications in various obvious aspects, all without departing from the spirit and scope thereof. Accordingly, the drawings and detailed description are to be regarded as illustrative in nature and not restrictive.

BRIEF DESCRIPTION OF THE DRAWINGS

FIG. 7A and FIG. 7B are perspective views of a wind turbine main bearing housing including two lubrication ports in accordance with the systems and techniques described herein.

FIG. 9A-9C are side views of three lubrication ports of a wind turbine main bearing housing in accordance with the systems and techniques described herein.

DETAILED DESCRIPTION

Figure 1:
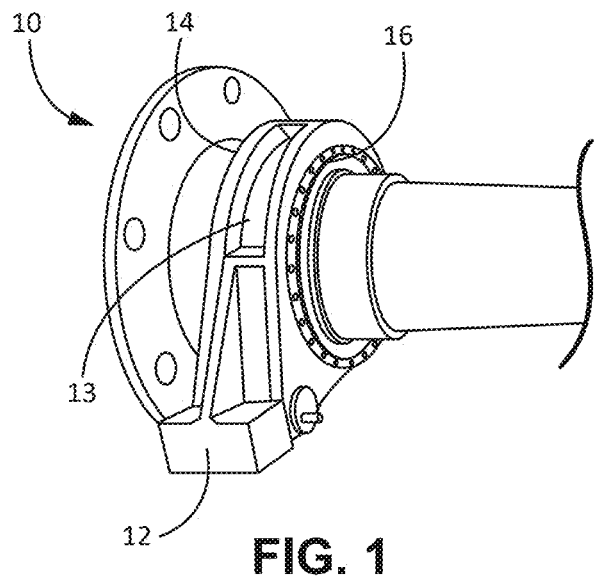
FIG. 1 is a perspective view of a wind turbine in accordance with the systems and techniques described herein.

The methods disclosed herein can be applied to a main bearing of a wind turbine, best shown in FIG. 1. The wind turbine main bearing 10 can include a main bearing housing 12. The main bearing housing 12 can have an upwind side 14 and a downwind side 16. The upwind side 14 can be the side on which a rotor (not shown) would be disposed. The downwind side 16 can be the side on which a generator (not shown) is located.

Figure 2:
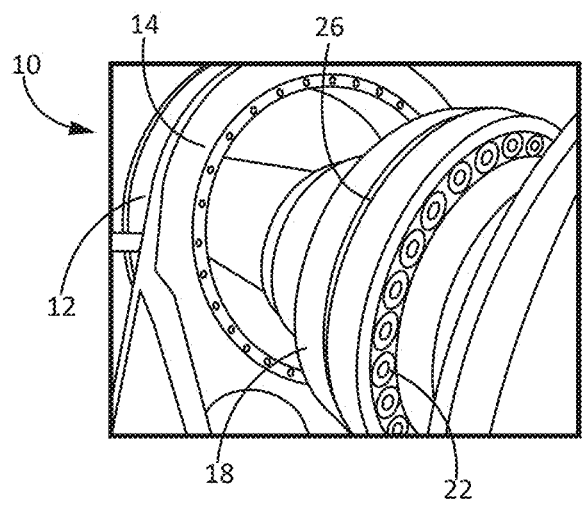
FIG. 2 is a perspective view of a wind turbine main bearing housing and wind turbine main bearing in accordance with the systems and techniques described herein.

The main bearing 10 can include a plurality of features. The main bearing housing 12 can have one or more pre-existing lubrication ports (not pictured) disposed on an upwind side 14 of the main bearing housing 12. With reference to FIG. 2, the main bearing 10 can include an outer race 18, an inner race 20 (visible in FIG. 11) radially disposed inwardly from the outer race 18, and a first row of roller bearings 22 and a second row of roller bearings 24 (visible in FIG. 10). The outer race 18 and inner race 20 can be within the main bearing housing 12. The first and second rows of roller bearings 22, 24 can be radially disposed between the inner race 20 and the outer race 18. The first row of roller bearings 22 can be axially disposed on the upwind side 14 of the second row of roller bearings 24. The main bearing housing 12 can be disposed around the outer race 18.

Figure 3:
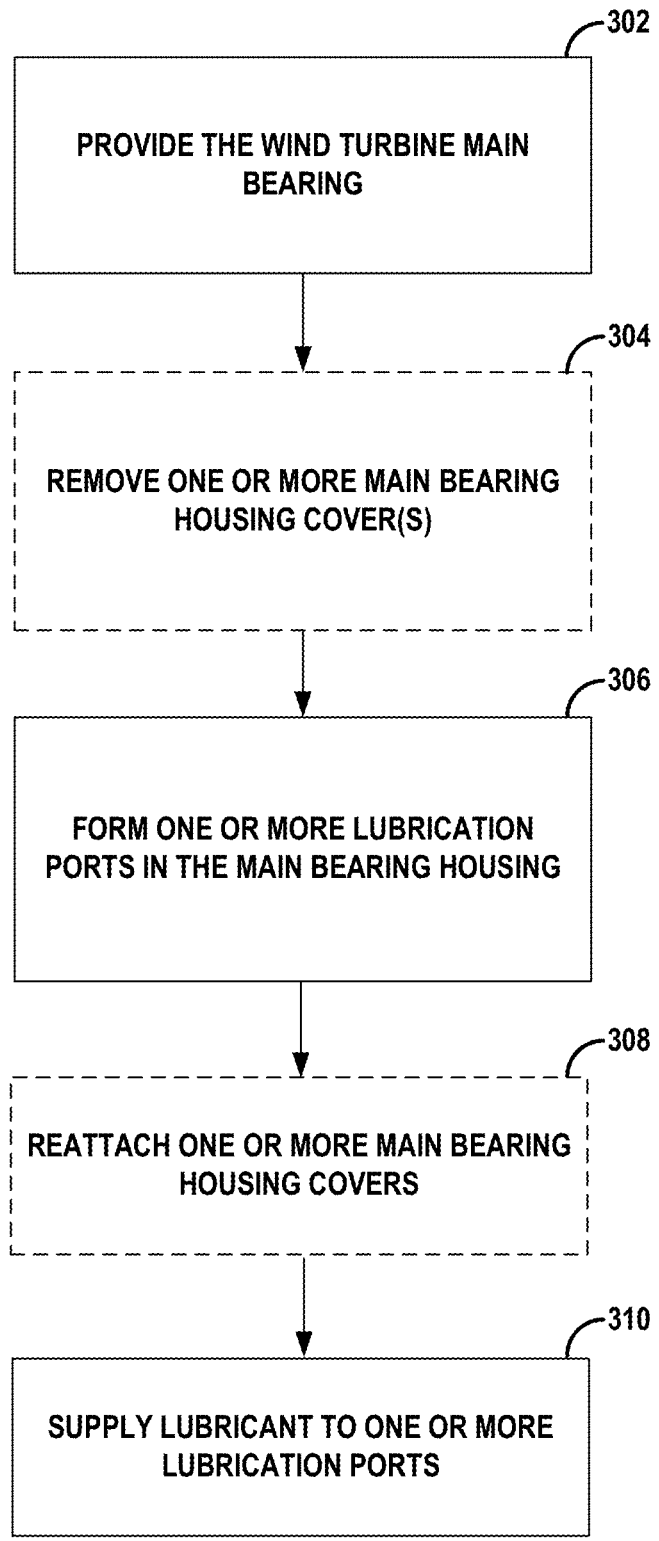
FIG. 3 is a flowchart showing a method of lubrication of a wind turbine in accordance with the systems and techniques described herein.

The embodiments herein are directed to a method of lubricating a wind turbine main bearing of a wind turbine. The method, best shown in FIG. 3, includes providing the wind turbine main bearing 302. The method includes forming one or more alternate lubrication ports 30 (shown in FIGS. 7A-8B) in the main bearing housing 306. The lubrication ports 30 can be radially directed in the main bearing housing 12. The one or more alternate lubrication ports 30 can be configured to deliver a lubricant supplied thereto between the first row of roller bearings 22 and the second row of roller bearings 24. The method also includes supplying the lubricant to the one or more alternate lubrication ports (310).

Figure 5:
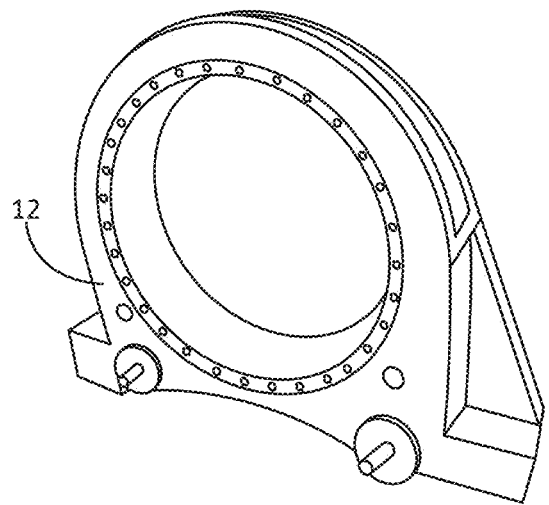
FIG. 5 is a perspective view of a wind turbine main bearing housing in accordance with the systems and techniques described herein.

The main bearing housing 12 can be disassembled from the wind turbine main bearing 10 in order to facilitate the modification of the bearing housing 12, as shown in FIG. 5. In some embodiments, the method can include removing one or more main bearing housing covers from the main bearing housing 12 prior to forming the one or more alternate lubrication ports (304).

Figure 4:
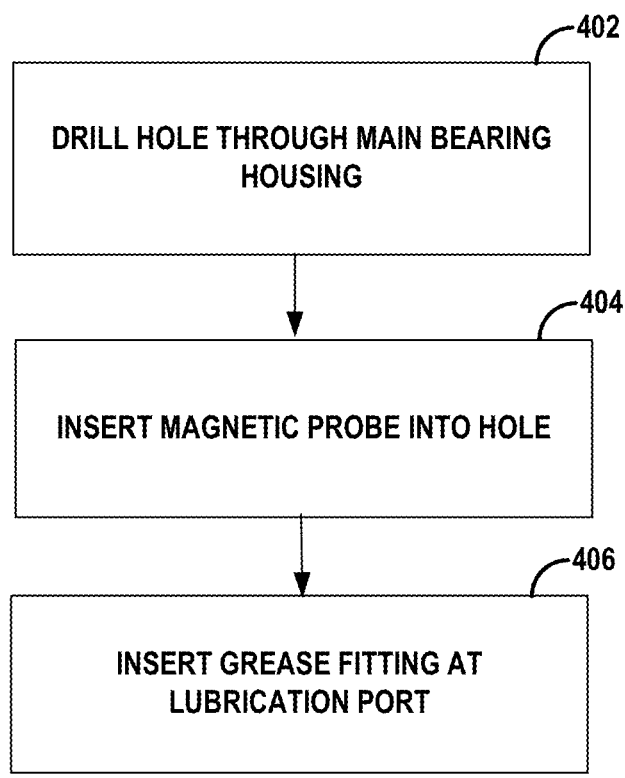
FIG. 4 is a flowchart showing a method of forming a lubrication port in a wind turbine main bearing housing in accordance with the systems and techniques described herein.
Figure 6:
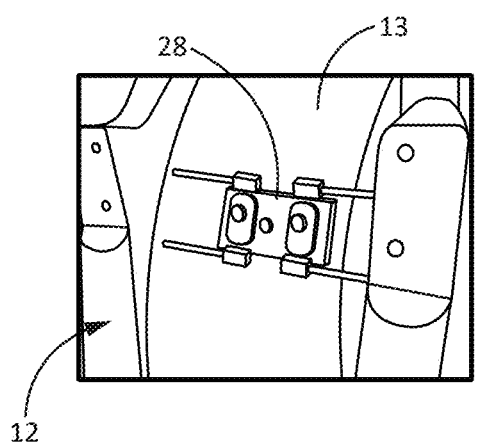
FIG. 6 is a perspective view of a turbine main bearing housing including a drill guide in accordance with the systems and techniques described herein.

The modification can include creating a plurality of lubrication ports, best described in FIG. 4. In some embodiments, the method can include drilling a hole through the main bearing housing (402), inserting a magnetic probe into the hole to remove debris from the hole (404), and installing a grease fitting at an entrance to the hole (406). Drilling the hole can be facilitated using a drill guide 28, such as the one shown in FIG. 6, or other drilling assistance fixture during drilling. A hand tap (not shown) can optionally be used in creating the hole. The drill guide 28 can be affixed to a wall or shoulder of the main bearing housing 12 and/or disposed between a pair of walls/shoulders of the main bearing housing 12.

Drilling a hole into the main bearing housing 12 can create debris within the hole, which should be removed prior to supplying lubricant. This debris can be made of metal, which can be magnetic. The magnetic probe (not pictured) can be inserted into the hole and removed from the hole until the metallic debris is removed from the hole. This process can be repeated as many times as necessary until the hole is generally free of metallic debris. The amount of times the magnetic probe is inserted into the hole can vary depending on the location of the hole, as the location of the hole cause more or less debris to fall into the hole whilst drilling.

Figure 8A:
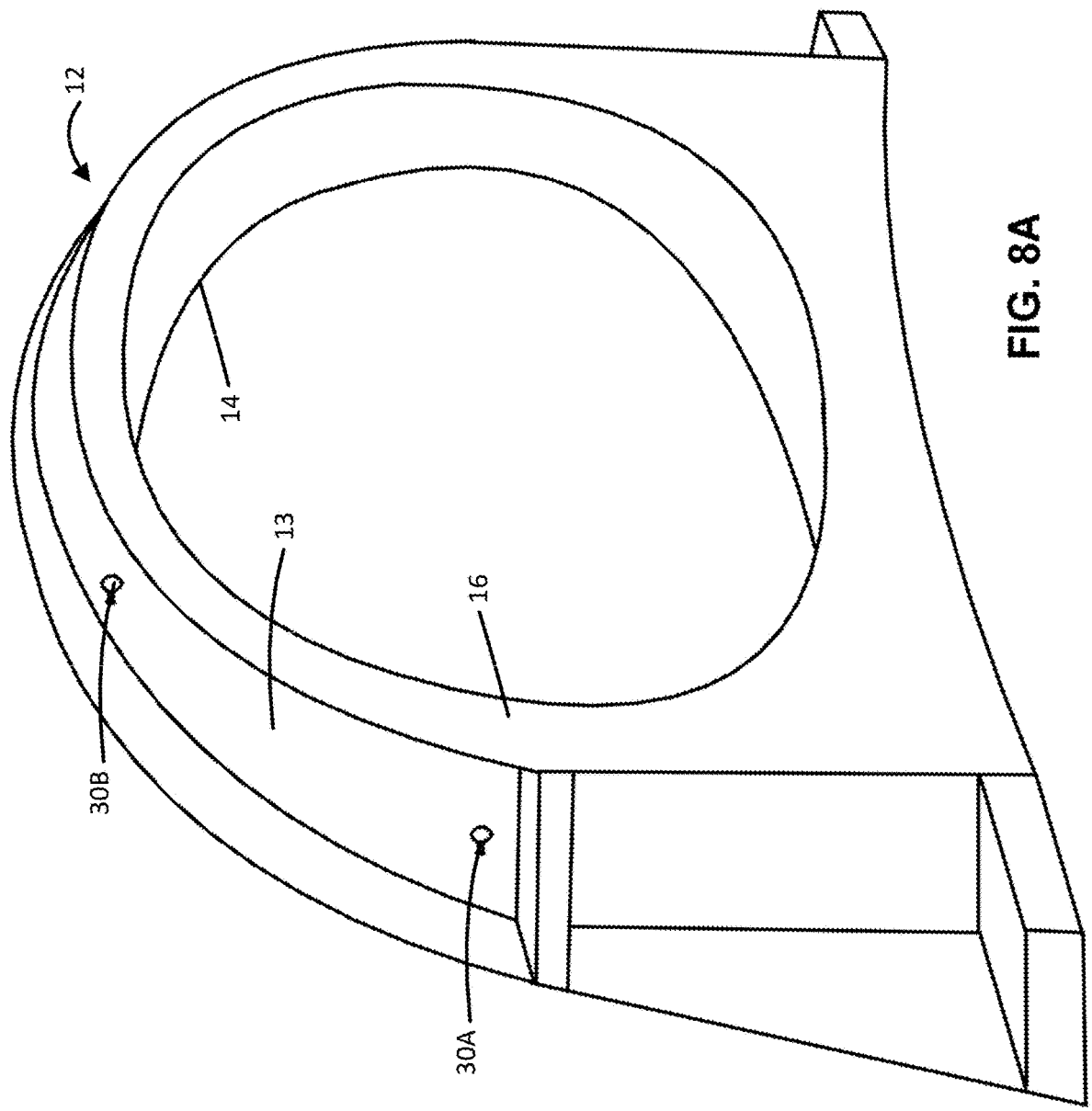
FIG. 8A and FIG. 8B are perspective views of a wind turbine main bearing housing including two lubrication ports in accordance with the systems and techniques described herein.
Figure 8B:
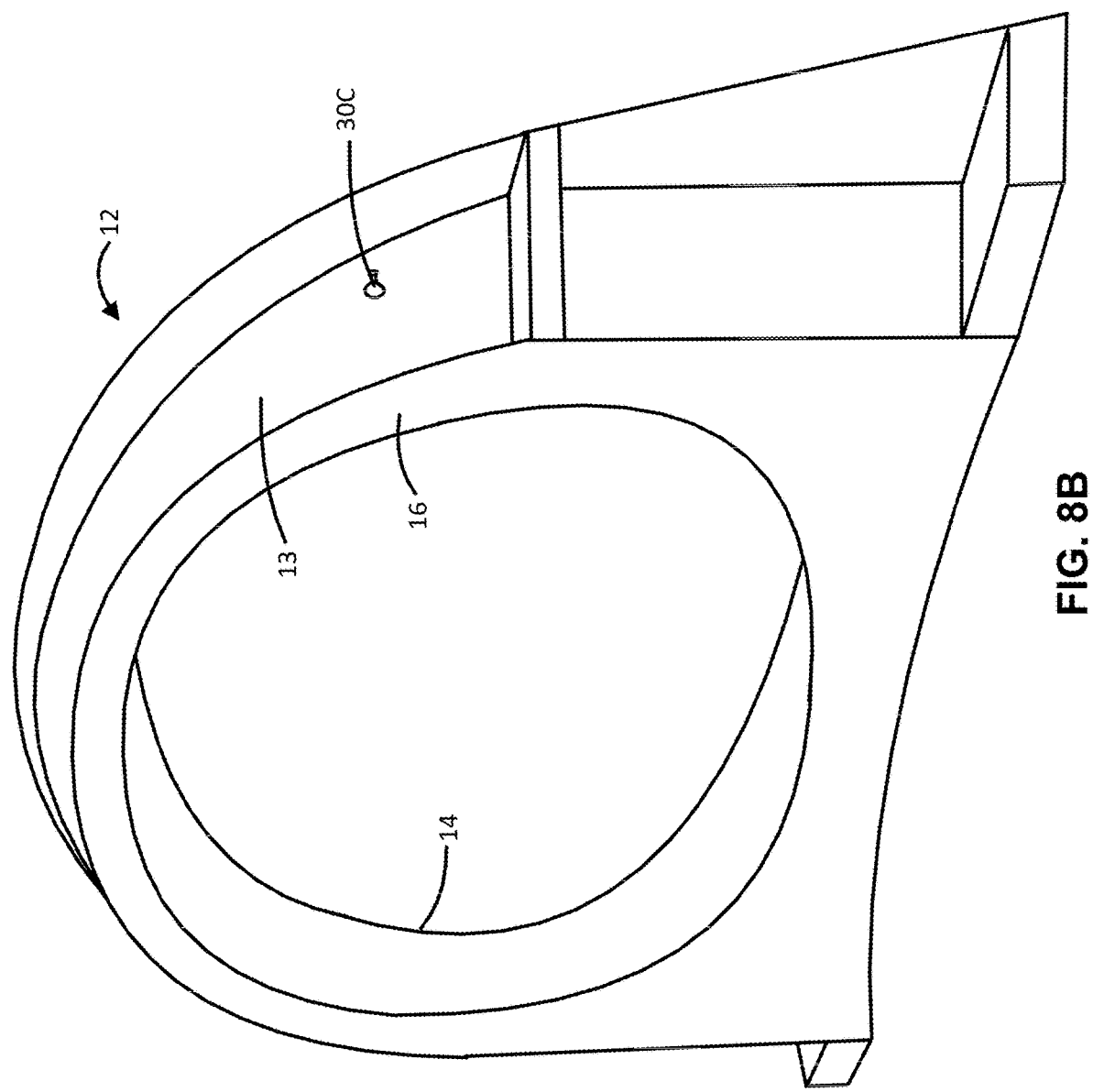

This modification can be completed on the main bearing housing 12 multiple times. For example, in some embodiments, the at least two alternate lubrication ports can be three alternate lubrication ports 30A, 30B, 30C, as seen in the embodiment shown in FIGS. 8A and 8B. The three alternate lubrication ports can be disposed on the main bearing housing 12 in a variety of configurations. In some embodiments, the three alternate lubrication ports 30A, 30B, 30C can be disposed circumferentially about a top half of the main bearing housing 12. For example, they may be disposed in a generally spaced apart configuration about a top half of the main bearing housing 12. In some embodiments, the three alternate lubrication ports 30A, 30B, 30C can be disposed circumferentially at a 9 o'clock position, an 11 o'clock position, and a 3 o'clock position about the top half of the main bearing housing, as shown in FIG. 8A and FIG. 8B (e.g., clock positions corresponding to viewing the main bearing housing from the downwind side). Using three lubrication ports reduces the length of the path travelled by the lubricant. In other embodiments, the lubrication ports 30 can be positioned at any location along the main bearing housing 12. Some portions of the wall 13 can be thicker than other portions of the wall 13. The lubrication ports 30 can be positioned in the wall 13 at any location where the wall 13 is thinner.

Figure 7B:
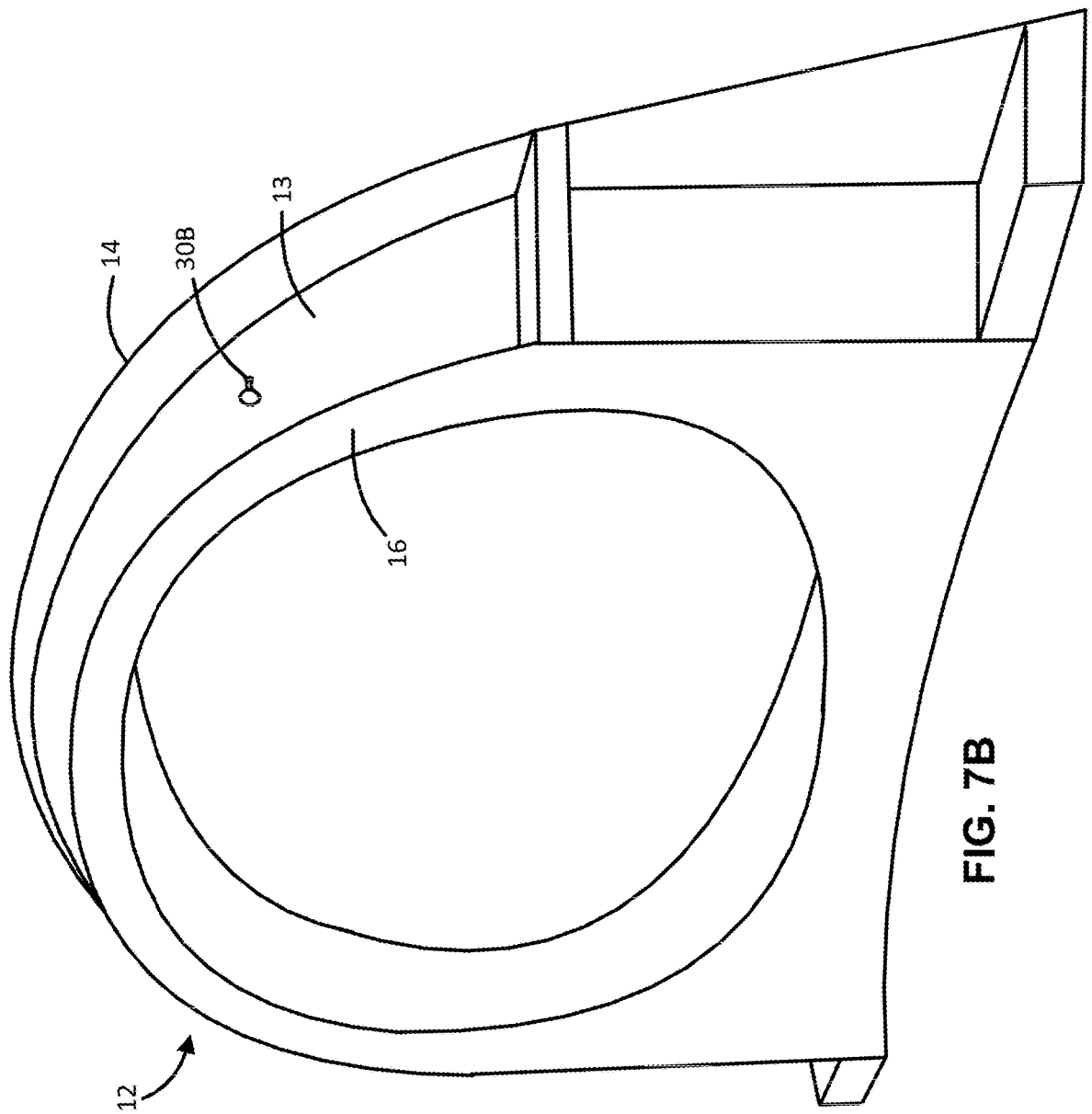

In some alternate embodiments, the one or more alternate lubrication ports 30 may include two alternate lubrication ports 30A, 30B, as shown in the example of FIGS. 7A and 7B. In an embodiment having two alternate lubrication ports, the two alternate lubrication ports may be disposed circumferentially at a 10 o'clock position and a 2 o'clock position about the top half of the main bearing housing 12, for example. The top half of the main bearing housing 12 can be the top portion as viewed from the downwind side 16 of the main bearing housing 12.

In some embodiments, the step of forming one or more lubrication ports (e.g., step 306, in FIG. 3) may include forming one or more radially directed lubrication ports in the main bearing housing, the one or more radially directed lubrication ports configured to deliver a lubricant supplied thereto between the first row of roller bearings and the second row of roller bearings, for example. In some embodiments, the one or more radially directed lubrication ports formed in the main bearing housing can include two lubrication ports disposed circumferentially about the top half of the main bearing housing. The lubrication ports 30 can be formed at any location that would reduce the path travelled by the lubricant.

FIGS. 9A-9C show exemplary lubrication fittings (e.g., grease fittings, grease zerks) 30A-30C that may be used for supplying lubricant through the alternate lubrication ports formed in a wall 13 of the main bearing housing 12, for example.

The main bearing housing 12 can be reassembled to the wind turbine main bearing 10. In some embodiments, the method includes re-attaching the one or more main bearing housing 12 to the wind turbine main bearing 10 after forming the one or more alternate lubrication ports (e.g., optional step 308 shown in FIG. 3).

Lubrication lines can be re-oriented on the device in order to facilitate the delivery of lubricant. In some embodiments, the method can include disconnecting one or more lubrication lines from one or more pre-existing lubrication ports. The method can include reconnecting the one or more lubrication lines to the one or more alternate lubrication ports 30.

Figure 10:
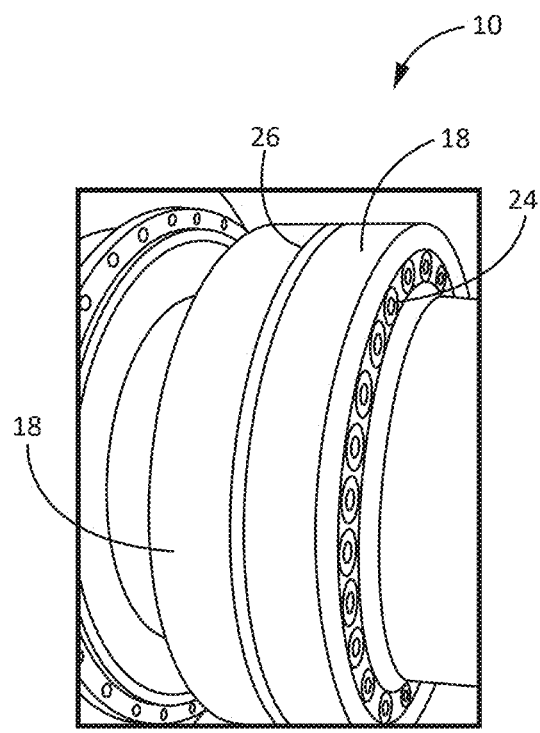
FIG. 10 is a perspective view of an outer race of a wind turbine main bearing in accordance with the systems and techniques described herein.

The lubricant can be delivered to structures associated with the outer race 18. In some embodiments, the one or more alternate lubrication ports 30 can be configured to deliver the lubricant supplied thereto to a radial groove 26 in the outer race 18. The radial groove 26 can be disposed axially between the first row of roller bearings 22 and the second row of roller bearings 24, as shown in FIG. 10.

The lubricant can be distributed between the bearings in a variety of configurations. In some embodiments, the lubricant delivered to the radial groove 26 can travel through the first row of roller bearings 22 toward the upwind side 14 of the main bearing housing 12. The lubricant can also travel through the second row of roller bearings 24 toward a downwind side 16 of the main bearing housing 12.

Figure 11:
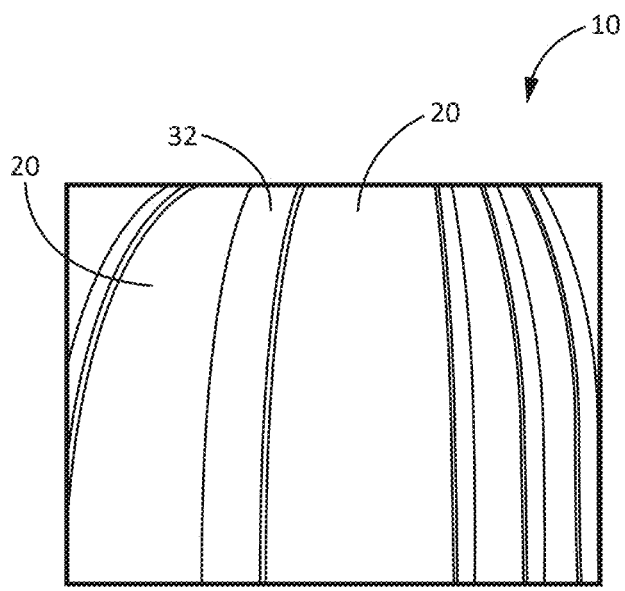
FIG. 11 is a perspective view of the inner race of a wind turbine main bearing in accordance with the systems and techniques described herein.
Figure 12:
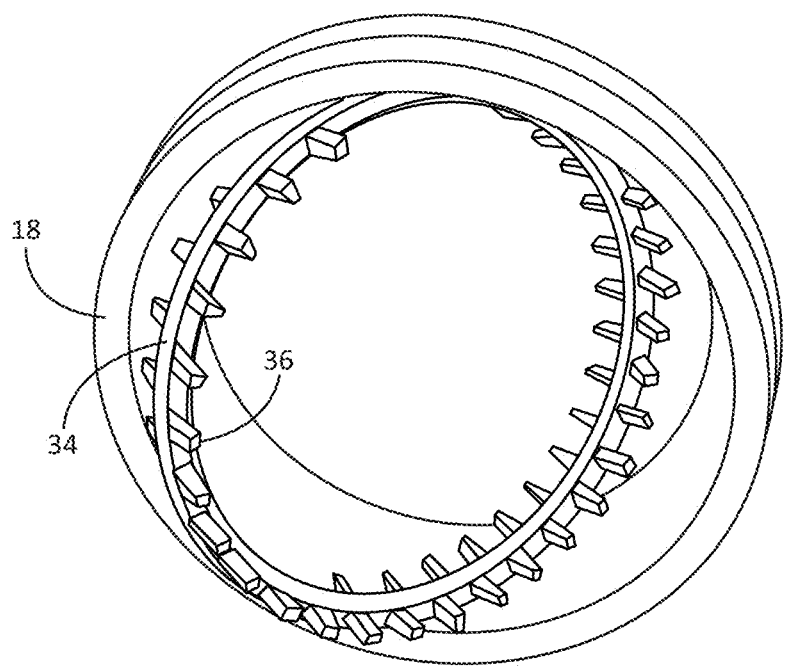
FIG. 12 is a perspective view of the outer race and brass cage of a wind turbine in accordance with the systems and techniques described herein.

The main bearing can include additional structures including a variety of features. In some embodiments, the first row of roller bearings 22 and the second row of roller bearings 24 can be separated by a central rib 32 formed on the inner race 20, as shown in FIG. 11. In some embodiments as shown in FIG. 12, a split brass cage 34 can separate the first row of roller bearings 22 from the second row of roller bearings 24. The split brass cage 34 can include a plurality of ribs 36 separating the roller bearings 22, 24.

The method is adaptable and can be performed in various environments. In some embodiments, the method can be performed while the wind turbine main bearing remains installed at an on-site field location. In a further embodiment, the method further includes removing the wind turbine main bearing from the wind turbine prior to performing the method. Removing the main bearing from the wind turbine can reduce risks associated with wind turbine maintenance.

While the various systems described above are separate implementations, any of the individual components, mechanisms, or devices, and related features and functionality, within the various system embodiments described in detail above can be incorporated into any of the other system embodiments herein.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, there is certain inadvertent error and variation in the real world that is likely through differences in the manufacture, source, or precision of the components used to make the various components or carry out the methods and the like. The term "about" also encompasses these variations. The term "about" can include any variation of 5% or 10%, or any amount—including any integer—between 0% and 10%. Further, whether or not modified by the term "about," the claims include equivalents to the quantities or amounts.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4% This applies regardless of the breadth of the range. Although the various embodiments have been described with reference to preferred implementations, persons skilled in the art will recognize that changes may be made in form and detail without departing from the spirit and scope thereof.

Although the various embodiments have been described with reference to preferred implementations, persons skilled in the art will recognize that changes may be made in form and detail without departing from the spirit and scope thereof.

What is claimed is:

1. A method of lubricating a wind turbine main bearing of a wind turbine, the method comprising:
   providing the wind turbine main bearing, the wind turbine main bearing comprising:
   a main bearing housing having one or more pre-existing lubrication ports disposed on an upwind side of the main bearing housing;
   an outer race;
   an inner race radially disposed inwardly from the outer race; and
   a first row of roller bearings and a second row of roller bearings, the first and second rows of roller bearings being radially disposed between the inner race and the outer race, the first row of roller bearings being axially disposed on the upwind side of the second row of roller bearings; and
   supplying a lubricant between the first row of roller bearings and the second row of roller bearings via one or more alternate lubrication ports formed in the main bearing housing.

2. The method of claim 1, the method further comprising:
removing one or more main bearing housing covers from the main bearing housing prior to forming the one or more alternate lubrication ports.

3. The method of claim 2, the method further comprising:
re-attaching the one or more main bearing housing covers to the main bearing housing after forming the one or more alternate lubrication ports.

4. The method of claim 1, wherein the one or more alternate lubrication ports are configured to deliver the lubricant supplied thereto to a radial groove in the outer race, the radial groove being disposed axially between the first row of roller bearings and the second row of roller bearings.

5. The method of claim 4, wherein the lubricant delivered to the radial groove travels through the first row of roller bearings toward the upwind side of the main bearing housing and travels through the second row of roller bearings toward a downwind side of the main bearing housing.

6. The method of claim 1, wherein the first row of roller bearings and the second row of roller bearings are separated by a central rib formed on the inner race.

7. The method of claim 6, further comprising a split brass cage separating the first row of roller bearings from the second row of roller bearings.

8. The method of claim 1, the method further comprising:
disconnecting one or more lubrication lines from the one or more pre-existing lubrication ports; and
reconnecting the one or more lubrication lines to the one or more alternate lubrication ports.

9. The method of claim 1, wherein the one or more alternate lubrication ports comprises at least two alternate lubrication ports.

10. The method of claim 9, wherein the at least two alternate lubrication ports comprises three alternate lubrication ports.

11. The method of claim 10, wherein the three alternate lubrication ports are disposed circumferentially about a top half of the main bearing housing.

12. The method of claim 11, wherein the three alternate lubrication ports are disposed circumferentially at a 9 o'clock position, an 11 o'clock position, and a 3 o'clock position about the top half of the main bearing housing.

13. The method of claim 1, further comprising forming the one or more alternate lubrication ports in the main bearing housing.

14. The method of claim 13, wherein forming at least one of the one or more alternate lubrication ports further comprises:
drilling a hole through the main bearing housing;
inserting a magnetic probe into the hole to remove debris from the hole; and
installing a grease fitting at an entrance to the hole.

15. The method of claim 1, wherein the method is performed while the wind turbine main bearing remains installed at an on-site field location.

16. The method of claim 1, wherein the method further comprises removing the wind turbine main bearing from the wind turbine prior to performing the method.

17. A method of modifying a wind turbine main bearing of a wind turbine, the method comprising:
providing the wind turbine main bearing, the wind turbine main bearing comprising:
a main bearing housing having an upwind side and a downwind side;
an outer race within the main bearing housing;
an inner race within the main bearing housing, the inner race disposed radially inwardly from the outer race; and
a first row of roller bearings and a second row of roller bearings, the first and second rows of roller bearings being radially disposed between the inner race and the outer race, the first row of roller bearings being axially disposed on the upwind side of the second row of roller bearings;
forming one or more radially directed lubrication ports in the main bearing housing, the one or more radially directed lubrication ports configured to deliver a lubricant supplied thereto between the first row of roller bearings and the second row of roller bearings.

18. The method of claim 17, wherein the one or more radially directed lubrication ports formed in the main bearing housing includes three lubrication ports disposed circumferentially about the top half of the main bearing housing.

19. The method of claim 18, wherein the three lubrication ports are disposed at a 9 o'clock position, an 11 o'clock position, and a 3 o'clock position about the top half of the main bearing housing as viewed from the downwind side of the main bearing housing.

20. The method of claim 18, wherein the two lubrication ports are disposed at a 10 o'clock position and a 2 o'clock position about the top half of the main bearing housing as viewed from the downwind side of the main bearing housing.

21. The method of claim 17, wherein the one or more radially directed lubrication ports formed in the main bearing housing includes two lubrication ports disposed circumferentially about the top half of the main bearing housing.

\* \* \* \* \*